United States Patent [19]

Kandl et al.

[11] Patent Number: 5,431,937
[45] Date of Patent: Jul. 11, 1995

[54] PROCESS FOR PREPARING OVEN-ROASTED FOOD

[75] Inventors: John R. Kandl, Rocky Mount, N.C.; Harry F. Freeland, Rockville, Md.

[73] Assignee: Hardee's Food Systems, Inc., Rocky Mount, N.C.

[21] Appl. No.: 373,488

[22] Filed: Jan. 17, 1995

Related U.S. Application Data

[63] Continuation of Ser. No. 91,829, Jul. 13, 1993, abandoned.

[51] Int. Cl.$^6$ .......................... A23L 1/314; A23L 1/315
[52] U.S. Cl. ........................................ 426/281; 426/92; 426/291; 426/296; 426/303; 426/641; 426/644
[58] Field of Search ............... 426/281, 302, 303, 644, 426/523, 92, 291, 296, 641

[56] References Cited

U.S. PATENT DOCUMENTS

| | | |
|---|---|---|
| 2,128,952 | 9/1938 | Mareta . |
| 2,709,658 | 5/1955 | Buchanan . |
| 3,245,800 | 4/1966 | Sanders . |
| 3,399,063 | 8/1968 | Schwall et al. . |
| 3,556,808 | 1/1971 | Panek . |
| 3,653,924 | 4/1972 | Penton . |
| 3,928,634 | 12/1975 | Gasbarro ........................ 426/281 |
| 3,950,555 | 4/1976 | Stromberg ..................... 426/281 |
| 3,962,472 | 6/1976 | Torres .......................... 426/281 |
| 3,989,851 | 11/1976 | Hawley et al. ................. 426/266 |
| 4,008,337 | 2/1977 | Bladow et al. ................. 426/281 |
| 4,012,808 | 3/1977 | Strong ...................... 426/644 X |
| 4,208,442 | 6/1980 | Evans et al. ................... 426/296 |
| 4,224,349 | 9/1980 | Gooch et al. ................... 426/281 |
| 4,254,151 | 3/1981 | Townsend .................. 426/281 X |
| 4,367,242 | 1/1983 | Jarvis et al. ................... 426/293 |
| 4,940,590 | 7/1990 | Williams et al. ................ 426/92 |
| 5,004,618 | 4/1991 | Buckholz et al. .............. 426/281 |
| 5,262,185 | 11/1993 | Babka et al. ............... 426/644 X |

Primary Examiner—Arthur L. Corbin
Attorney, Agent, or Firm—Cushman Darby & Cushman

[57] ABSTRACT

Fresh chicken quarters are needle injected with a marinade including juiciness and browning reaction-facilitators and smoke flavoring. The marinated quarters are dipped into an aqueous suspension of seasonings and spices, then baked in a convection oven at 250° F. for 20 minutes for drying the surface coating of seasoning and spices. A glaze is spread on the seasoning- and spice-coated marinated chicken parts for sealing in moisture and enhancing achievement of desirable browning. The glazed chicken parts are roasted (baked) on trays in a convection oven at 250° F. for 40 minutes, removed, and served as a succulent product having an appearance and taste which is competitive with that of rotisserie-broiled chicken.

24 Claims, 1 Drawing Sheet

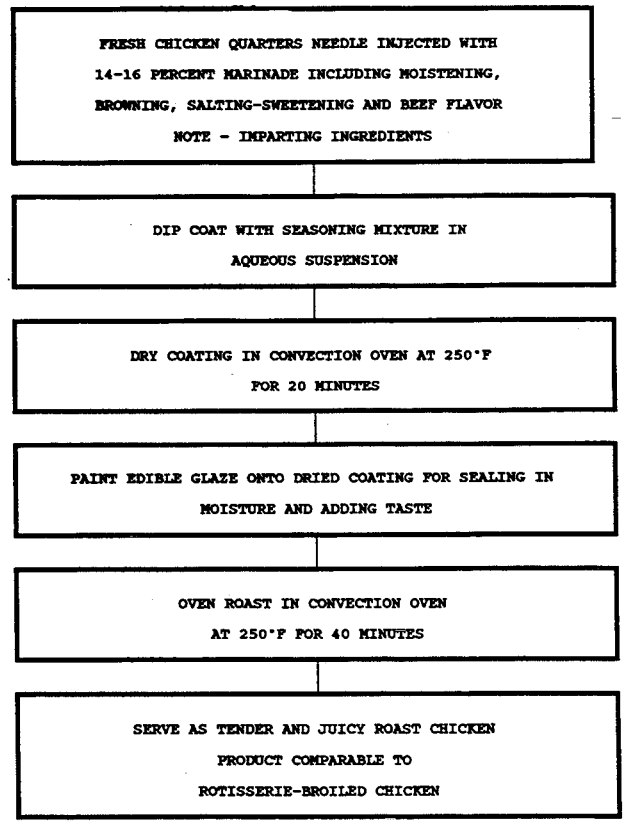

```
┌─────────────────────────────────────────────────────────┐
│   FRESH CHICKEN QUARTERS NEEDLE INJECTED WITH           │
│   14-16 PERCENT MARINADE INCLUDING MOISTENING,          │
│   BROWNING, SALTING-SWEETENING AND BEEF FLAVOR          │
│        NOTE - IMPARTING INGREDIENTS                     │
└─────────────────────────────────────────────────────────┘
                            │
┌─────────────────────────────────────────────────────────┐
│         DIP COAT WITH SEASONING MIXTURE IN              │
│              AQUEOUS SUSPENSION                         │
└─────────────────────────────────────────────────────────┘
                            │
┌─────────────────────────────────────────────────────────┐
│      DRY COATING IN CONVECTION OVEN AT 250°F            │
│                 FOR 20 MINUTES                          │
└─────────────────────────────────────────────────────────┘
                            │
┌─────────────────────────────────────────────────────────┐
│   PAINT EDIBLE GLAZE ONTO DRIED COATING FOR SEALING IN  │
│              MOISTURE AND ADDING TASTE                  │
└─────────────────────────────────────────────────────────┘
                            │
┌─────────────────────────────────────────────────────────┐
│           OVEN ROAST IN CONVECTION OVEN                 │
│             AT 250°F FOR 40 MINUTES                     │
└─────────────────────────────────────────────────────────┘
                            │
┌─────────────────────────────────────────────────────────┐
│    SERVE AS TENDER AND JUICY ROAST CHICKEN              │
│              PRODUCT COMPARABLE TO                      │
│            ROTISSERIE-BROILED CHICKEN                   │
└─────────────────────────────────────────────────────────┘
```

PROCESS FOR PREPARING OVEN-ROASTED FOOD

This is a continuation of application Ser. No. 08/091,829, filed on Jul. 13, 1993, which was abandoned upon the filing hereof.

BACKGROUND OF THE INVENTION

Poultry, and particularly chicken, has grown in popularity in recent years as a source of animal protein in peoples' diets in the United States. It is a food that is conveniently eaten at restaurants or taken out for consumption in a picnic setting, or at home or at work.

Food, and particularly marinated meat, roasted over an open fire develops characteristic coloring and taste which causes many consumers to prefer grilled food, to meals made with the same basic ingredients, but baked or steamed.

Equipping a restaurant kitchen is an expensive undertaking. And once a commercial kitchen has been laid out and fully equipped, there may be no room to add further large pieces of equipment, such as a rotisserie.

Therefore, a restaurant operator, who has a fully equipped kitchen, faces a dilemma if its clientele develops a strong and growing taste for rotisserie-cooked chicken, if that kitchen or restaurant has no place in it to prepare such a product.

The present invention grew out of thought given by the inventors to solve that dilemma, particularly in the context of a so-called fast food or limited menu or quick service restaurant.

It should be understood, however, that the poultry subjected to the process of the invention need not be chicken. It could as well be turkey, capon, duck or the like. The word "chicken", where used herein, is meant to be generic to such poultry unless the contrary is made clear in context.

Similarly, although the process was developed to be partly conducted by suppliers, and partly at a fast food restaurant, the place where the several steps are conducted could be changed without departing from the principles of the invention.

For instance, some steps could be conducted at a central commissary, and a second baking could be conducted by a consumer in the consumer's convection oven at home.

Any or all of the steps could be conducted in a grocery store, a home, a restaurant or other food preparation facility.

SUMMARY OF THE INVENTION

Fresh chicken quarters are needle injected with a marinade including juiciness and browning reaction-facilitators and smoke flavoring. The marinated quarters are dipped into an aqueous suspension of seasonings and spices, then baked in a convection oven at 250° F. for 20 minutes to dry the surface coating of seasoning and spices. A glaze is spread on the seasoning- and spice-coated marinated chicken parts for sealing in moisture and enhancing achievement of desirable browning and crispiness. The glazed chicken parts are roasted (baked) on trays in a convection oven at 250° F. for 40 minutes, removed, and served as a succulent product having an appearance and taste which is competitive with that of rotisserie-broiled chicken.

The principles of the invention will be further discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

The sole FIGURE of the drawing is a flow diagram of a preferred embodiment of the process of the present invention.

DETAILED DESCRIPTION OF THE INVENTION

The process of the invention may be conducted on a variety of pieces or chunks of meat or other foods, whether as cut from the animal or plant, or after preliminary processing, such as chopping, forming into patties and enrobing with synthetic or artificial skin or other coating.

The preferred raw main ingredient of the product is chicken. The preferred chicken ingredient is USDA Grade A or equivalent fryer or broiler quarters, without tails and fat clumps, feathers and hairs, weighing at least 2.75 pounds (1.25 kg) per chicken. The preferred per chicken maximum weight is 3.05 pounds (1.38 kg). Unless immediately processed, the chicken quarters are stored at 28° F. to 34° F. ($-2°$ C. to $+2°$ C.) in conventional oxygen-free atmosphere packaging capable of maintaining a residual oxygen level of less than 3.0 percent at the time of packaging, and assuming that the raw chicken ingredient shelf life is thirteen days, including the kill date. Typically suitable packaging calls for packing the eight quarters of two chickens in vented polyethylene bags, and packing seven or eight bags per 3.5 mil vacuum heat-sealed polyester/polyethylene-lined, externally strap-reinforced, corrugated cardboard box (case), containing a filling of dry ice pellets outside and surrounding a polyethylene liner. Typical case dimensions are $13\frac{1}{8} \times 18\frac{3}{4} \times 10\frac{1}{4}$ inches ($33 \times 48 \times 26$ cm).

After being cut into quarters, but before being packed, each chicken quarter typically has 95 percent skin coverage. The quarters are placed skin side up on trays or conveyor flights and run under an injector unit for needle-injecting a marinade into the muscle meat of each quarter. The apparatus for injecting a liquid into chicken quarters is already known in the trade, so it does not need to be disclosed in detail in this document. The names and addresses of two vendors which presently commercially practice needle injecting of liquid into chicken quarters, and whose equipment has proven acceptable for use in practicing this aspect of the process of the present invention, are:

MEPSCO, Inc., 1090 Atlantic Drive, West Chicago, Ill. 60185; and

Robert Reiser Company, 725 Dedham Street, Canton, Mass. 02021.

In the preferred equipment, the needles are arranged in banks, so that about forty needles inject each chicken quarter. The needles are resiliently mounted and valved, so that no marinade issues from the tip of any needle which has not engaged a chicken part as the bank of needles is lowered from above, and so that each needle penetrates into the muscle an amount which is limited by resistance to penetration.

The amount of weight gained due to needle injection of marinade preferably is 14 to 16 percent, so that the as-packaged weight of the four quarters for each chicken preferably is within the range of 2.20 to 3.54 pounds (1.00 to 1.61 kg).

The marinade preferably is prepared by diluting a previously prepared marinade concentrate (which is a dry blend of ingredients) to produce an injectable marinade solution which is 95 percent water and 5 percent marinade concentrate (by weight).

The preferred constituency of the marinade concentrate is as follows:

| Constituent | Range (wt. %) | Preferred Point Value (wt. %) |
| --- | --- | --- |
| sodium phosphate | 50–60 | 56 |
| autolyzed yeast | 10–20 | 17 |
| maltodextrin | 10–20 | 13 |
| sodium chloride | 10–20 | 10 |
| calcium silicate | 0–2 | 2 |
| beef extract | 0–2 | 1.5 |
| natural smoke flavor | 0–1 | 0.5 |
|  |  | 100.0 |

By preference, each case of raw chicken ingredient (marinated chicken quarters) is marked as to kill date, so that the individual restaurant which receives a case knows how much of the thirteen-day shelf life of the ingredient has already elapsed. Thus, an individual restaurant typically might refuse to accept a case on which the shelf life already has more than half elapsed.

When it is desired to convert the raw chicken ingredient into a roasted chicken product that is ready to eat, the next stages of the method are conducted.

A quantity of seasoning dip is made up in a dipping pan, which may, for instance, be a cylindrical, flat-bottomed, eight-quart stainless steel steam table insert pan. The seasoning dip mix preferably is acquired as a dry, particulate mixture, of sandy texture, which is packaged in convenient-sized packages, e.g., eight 4-pound polyethylene bags per case.

The preferred consistency of the seasoning dip mix is as follows:

| Constituent | Range (wt. %) | Preferred Point Value (wt. %) |
| --- | --- | --- |
| Salt | 30–60 | 45 |
| Maltrin | 25–35 | 30 |
| Chili Powder | 5–10 | 7 |
| Dextrose | 0–10 | 5 |
| Black Pepper | 2–6 | 4 |
| Cornstarch | 1–5 | 3 |
| Onion | 1–5 | 2 |
| Garlic | 1–5 | 2 |
| White Pepper | 1–3 | 1 |
| Celery, Ground | 0–1 | 0.5 |
| Spices | 0–1 | 0.5 |
|  |  | 100.0 |

The oven which will be used for drying the seasoning coating on the marinated chicken and, thereafter, for roasting the glazed seasoned marinated chicken, preferably is a convection oven. A commercially available oven that has been found to be suitable is the Blodgett convection oven, Model CTB-1, having the following main characteristics:

| Cavity dimensions | 15¼" × 20" × 1" |
| --- | --- |
| Number of shelves | 5 |
| Temperature range | 200–500° F. |
| Recovery time (after door open) | dependent on quantity of product, initial temperature, oven temperature setting, etc. |
| BTUs/hour at 200° F. | 5.6 kw |
| Air flow rate | 850 C.F.M. |

In preparation for drying the coating on the marinated chicken, the oven is preheated to 250° F. (121° C.). In a restaurant which serves biscuits baked on the premises, some shelves of the oven may simultaneously be in use for baking biscuits.

In making up the seasoning dip, two quarts of cold water are measured into the dipping pan. A bag of seasoning dip is opened, and slowly poured into the pan, while the liquid is stirred using a wire whip. The seasoning dip has an appearance similar to that of a thin, grainy gingerbread batter. If the seasoning dip is not going to be immediately used, it should be covered and refrigerated. Once any raw chicken ingredient has been in contact with the dip, the need to keep it refrigerated when not in use, and to discard unused quantities is heightened.

For dip-coating the raw chicken ingredient with the seasoning dip, three pieces at a time of raw chicken ingredient are taken from a bag from the refrigerator and dipped and swirled in the mixture in the pan. Each coated piece is lifted out, briefly permitted to drain, and placed skin side up on a baking tray. These steps are repeated, until a desired number of seasoning mix-coated quarters are in place on the tray or trays.

Those familiar with convection ovens will not be surprised to read that, despite heated air movement within an oven, temperatures tend to be higher at some levels in the oven than at others. In order to accommodate that reality, it is recommended by the inventors that dipping mix-coated wing quarters be placed on one tray, and that dipping mix-coated leg quarters be placed on another, so that by placing the tray containing the wing quarters in at hotter level, both the wing and leg quarters will be ready simultaneously, both for the seasoning coating drying step, and for the main baking step.

Because the seasoning mix is a suspension in which some undissolved solids are denser than the bulk of the solution, it is necessary for the worker to frequently stir the mixture, in order to ensure that all chicken quarters get their share of all of the mixture.

In the preferred oven, the trays each hold eight pieces.

Although it is preferred that trays of dipping mix-coated chicken quarters be placed in the oven as each tray is completed, it is possible to refrigerate them, preferably for not more than one hour, before conducting the first baking to dry the coating.

The oven temperature is controlled while used in the process, so that the heat comes on when the temperature sensor senses that the cavity temperature has dropped below 250° F. (122° C.) so that (with the exception of a brief recovery period after the oven door has been opened to introduce and/or remove trays) cavity temperature remains within the range of 230° F. to 300° F. (108° C. to 147° C.).

The coating-drying first baking is conducted on each tray of chicken for approximately 20 minutes, during which time the water dries out of the seasoning coating on the surface of the chicken quarters. The internal temperature of the partly baked chicken quarters at the conclusion of the coating-drying first baking stage is about 100° F. to 120° F. (38° C. to 50° C.). At this stage, the seasoning coating should look dry or almost dry.

The seasoning coated chicken quarters, still on the baking trays, are removed from the oven and coated with an edible glaze.

The preferred consistency of the glaze is as follows:

| Constituent | Range (wt. %) | Preferred Point Value (wt. %) |
| --- | --- | --- |
| Soy Bean Oil | 40–60 | 50 |
| High Fructose Corn Syrup | 20–60 | 35 |
| Brown Sugar | 0–20 | 8 |
| Soy Lecithin | 0–8 | 5 |
| Honey | 0–4 | 1.8 |
| Citric Acid | 0–.4 | .2 |
| | | 100.0 |

A combination of gums can be used in place of some or all of the lecithin, to stabilize (emulsify) the oil water suspension of ingredients of the glaze.

The glaze preferably is premanufactured, and supplied in sealed flexible plastic film pouches, 2.0 pounds (0.91 kg) per package. Inasmuch as the glaze includes both oil soluble and water soluble components and an insufficient quantity of emulsifier to create a stable emulsion, the pouches are deliberately made somewhat oversize, in order to make it easy for the worker to mix the contents, by kneading, prior to opening the pouch and emptying its contents into a pan. By preference, a pastry brush is used to paint the glaze onto the seasoning-coated chicken immediately after the chicken has been removed from the oven following the coating-drying first baking.

As with the dipping mix, the shelf life of any glaze which has contacted chicken is shortened, so, for low-volume usage, a worker can split the contents of one pouch into two pans, one being used immediately, and the other being covered and refrigerated until needed. In any event, glaze which has touched chicken should be discarded as workers change shift, and any panned but unused dip and glaze should be discarded as the restaurant goes through a day-end checklist.

The glazed chicken is returned to the same oven on the trays, and roasted nominally at 250° F. (121° C.), subject to the temperature control discussed above, for about 40 additional minutes, to an internal temperature of 172° F. to 195° F. (78° C. to 89° C.), and preferably 177° F. (80° C.).

At the conclusion of the second cooking (roasting, baking) cycle, the chicken is removed from the oven and, if not immediately served, is preferably placed on the grates of holding cabinet trays, where its shelf life is up to two hours. In a display case, where heat and humidity are less subject to control, the shelf life is one-half hour. (Roasted chicken which has been in the holding cabinet before being placed in the display cabinet still has a shelf life not to exceed two hours total time since removal from the oven at the conclusion of the second baking).

The inventors provide the following further discussion of the process for those having a more detailed interest.

The chicken which has been slaughtered, eviscerated, trimmed and chilled must not be frozen when injected with the marinade. Freezing can result in bent or broken marinade injection needles, and interfere with uptake of marinade into the meat.

The term "fresh chicken" as used herein is meant to include not only chicken which is newly killed and dressed without ever having been frozen, but also chicken which, after being killed and dressed, was subjected to such intense chilling and/or freezing that aging of the meat was substantially suspended for an indefinite but industry-accepted period of time, whereafter it was restored by controlled tempering or thawing to a nonfrozen state virtually equivalent for use in the process to that of newly killed and dressed but never frozen chicken.

The size of the poultry which can be injected can vary from less than one pound (0.454 kg) to twenty pounds (9.08 kg). Although injection is most conveniently done on quarters, skin side up, it can be practiced on halved or whole birds, on slices and pieces, with or without skin.

The recommended temperature of the marinade at the time of injection is 38° F. to 41° F. (4° C. to 6° C.). If the marinade is too cold, solubility of some components may decrease causing them to precipitate; and, the viscosity may increase to a point where flow through the needles is too slow, or once injected, the marinade remains in pockets, without desired dispersal. If the marinade is too warm, the keeping quality of the chicken may be adversely affected, and too much marinade may be injected into the meat.

The quantity of marinade injected has been studied in the range of 0 to 24 percent uptake, by weight. Poultry injected with levels of marinade in excess of 20 percent showed a tendency towards breakdown of intermuscular and intramuscular tissue, causing the meat to become soft or mushy. At the opposite extreme, poultry injected with levels of marinade less than 6 percent shows little tendency to maintain juiciness through to the conclusion of the second cooking (roasting) step, particularly if the raw marinated chicken ingredient was frozen or nearly frozen prior to being coated and subjected to the first cooking step, or if the coating step was not conducted until more than 5 days after the chicken had been killed.

During distribution, storage and handling, some marinade inevitably leaks out of the raw marinated chicken. Loss can be temporarily retarded by lowering the temperature. But, if freezing occurs, leakage will resume when thawed.

Although it is preferred that the seasoning mix be applied by dipping into an aqueous suspension, the mixture of spices, salt, sugars and starches could be rubbed dry onto raw chicken main ingredient. Use of the liquid dip is preferred because it facilitates uniformity and consistent coverage. And, the dipped coating sets up an artificial barrier to limit penetration of the spice ingredients into the interior of the chicken.

The length of time that the seasoning dip remains in contact with the chicken will affect the extent of penetration of seasonings into the meat, and therefore, modify the flavor profile of the product. The flavor continues to penetrate during cooking, so the lower the roasting temperature, the greater will be the extent of penetration. And, at lower cooking temperatures, less of the more-volatile constituents of the spices will be lost to evaporation. By preference, the time that the wet seasonings dip remains in contact with the chicken (between dipping time and first cooking) to the point of coating dryness, is about one hour. The taste imparted by the dip constituents is more uniform in the meat when the chicken is prepared "skin on", than if the skin is removed prior to the dipping step being conducted.

The various preferred main components of the glaze can be substituted for as follows:

| Preferred | Can Be Substituted |
| --- | --- |
| High Fructose Corn Syrup | Sugar Water, molasses |
| Citric Acid | Lemon Juice |
| Vinegar | White, Cider, red, flavored vinegar |
| Honey | Natural or Artificial Flavor with Corn Syrup |
| Soybean Oil | Any Vegetable Oil (liquid at room temperature) |
| Water | Water |
| Lecithin (Emulsifier) | Gums, natural or artificial, i.e., propylene glycol alginate, carrageenan gum arabic, locust bean gum, xanthan gum |

While the glaze can be applied at any time prior to or during cooking, it has been found to work best when the seasoning dip-coated surface has just dried. The glaze preferably is brushed (painted) on, but could be sprayed on. The glaze can contain ingredients similar to those in the seasoning dip. Dispersion is important to assure uniform coating.

The first and second cooking steps are conducted at 230° F. to 300° F. for a total of 50 to 75 minutes, to an internal temperature of 172° F. to 195° F. The holding cabinet air temperature is 150° F. to 180° F. If the chicken is cooked at a temperature higher than 275° F., it will cook faster, allowing more throughput, but the resulting product will be drier (less moist). If the chicken is cooked at lower than 220° F., throughput will suffer and the flavor profile will be altered.

Regional and personal preferences can be accommodated by adding dry ingredients to the dip or glaze, or applying a further, post-glazing coating of starch, gum, batter, breading, flavorings, sauces and the like.

The product of preferred practices of the present invention, is a marinated, seasoned, glazed, oven-roasted chicken which looks like and tastes like rotisserie broiled chicken.

It should now be apparent that the roasted chicken as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A process for preparing oven-roasted food which is competitive with rotisserie-broiled food, comprising:
   (a) needle injecting into pieces of food a liquid marinade including moisture and precursors for roasted flavor;
   (b) thereafter providing the thus marinated food pieces with a coating of seasoning;
   (c) thereafter surface-drying the thus seasoning-coated, marinated food pieces in a convection oven at a temperature in the range of 230° F. to 300° F. for about 20 minutes;
   (d) thereafter covering the thus surface-dried, seasoning-coated, marinated food pieces, throughout at least half of the exterior surface of each piece including an upper side thereof, with a coating of moisture loss-reducing edible glaze; and
   (e) thereafter roasting the thus glazed, seasoned, marinated food pieces in a convection oven at a temperature in the range of 230° F. to 300° F. to an internal temperature in the range of 172° F. to 195° F.

2. The process of claim 1, wherein:
said pieces of food are pieces of fresh chicken.

3. The process of claim 2, wherein:
said pieces of fresh chicken are chicken quarters having attached chicken skin equating to at least 95 percent of that on the corresponding dressed chickens from which respective fours of said quarters have been cut.

4. The process of claim 3, wherein:
each said respective four quarters weighs at least 2.75 pounds.

5. The process of claim 2, further including:
prior to conducting step (a), killing and dressing chicken and cutting the dressed chicken into quarters to provide said pieces.

6. The process of claim 5, wherein:
in conducting step (a), said chicken quarters are oriented so as to each have a lower, supported side and an upper side, and said liquid marinade is injected into said chicken quarters through said upper side of each chicken quarter.

7. The process of claim 6, wherein:
when subjected to step (a), said chicken quarters have attached thereto and disposed predominately on said upper sides thereof naturally accompanying chicken skin equating to at least 95 percent of that on the corresponding dressed chickens from which respective fours of said quarters have been cut.

8. The process of claim 7, wherein:
in conducting step (a), each chicken quarter is penetrated by approximately forty injector needles, through which said liquid marinade is injected.

9. The process of claim 8, wherein:
at least some of said liquid marinade is injected by said injector needles through chicken skin of said chicken quarters into muscle meat of said chicken quarters.

10. The process of claim 9, wherein:
said liquid marinade, at time of injection, is at a temperature within the range of 38° F. to 41° F.

11. The process of claim 5, wherein:
as a result of conducting step (a), said marinated chicken quarters contain 6–20 percent liquid marinade, by weight.

12. The process of claim 11, wherein:
said liquid marinade is composed of about 95 percent by weight water and about 5 percent by weight of a marinade concentrate composed of:

| Constituent | Weight Percent Range |
| --- | --- |
| sodium phosphate | 50–60 |
| autolyzed yeast | 10–20 |
| maltodextrin | 10–20 |
| sodium chloride | 10–20 |
| calcium silicate | 0–2 |
| beef extract | 0–2 |
| natural smoke flavor | 0–1. |

13. The process of claim 12, wherein:

as a result of conducting step (a), said marinated chicken quarters contain 14–16 percent liquid marinade, by weight.

14. The process of claim 5, wherein:

step (b) is conducted by dipping said marinated chicken quarters in an aqueous suspension of a dry seasoning mixture, and removing the seasoning-coated marinated chicken quarters from said aqueous suspension.

15. The process of claim 14, further including:

allowing some of said seasoning coating to drain from said seasoning-coated marinated chicken quarters, then placing said seasoning-coated, marinated chicken quarters on trays onto which said seasoning coating drains so as to become located underneath said seasoning-coated marinated chicken quarters, and conducting step (c) while said seasoning-coated marinated chicken quarters are supported on said trays.

16. The process of claim 14, wherein:

said aqueous suspension is prepared by mixing water and said dry seasoning mixture together in the approximate proportion of two quarts of water to four pounds of dry seasoning mixture, and said dry seasoning mixture is composed of:

| Constituent | Weight Percent Range |
| --- | --- |
| sodium chloride | 30–60 |
| maltrin | 25–35 |
| chili powder | 5–10 |
| dextrose | 0–10 |
| black pepper | 2–6 |
| cornstarch | 1–5 |
| onion | 1–5 |
| garlic | 1–5 |
| white pepper | 1–3 |
| celery | 0–1 |
| spices | 0–1. |

17. The process of claim 14, wherein:

in conducting step (a), said chicken quarters are oriented so as to each have a lower, supported side and an upper side, and said liquid marinade is injected into said chicken quarters through said upper side of each chicken quarter;

when subjected to step (a), said chicken quarters have attached thereto and disposed predominately on said upper sides thereof naturally accompanying chicken skin equating to at least 95 percent of that on the corresponding dressed chickens from which respective fours of said quarters have been cut;

in conducting step (a), each chicken quarter is penetrated by approximately forty injector needles, through which said liquid marinade is injected;

at least some of said liquid marinade is injected by said injector needles through chicken skin of said chicken quarters into muscle meat of said chicken quarters;

as a result of conducting step (a), said marinated chicken quarters contain 6–20 percent liquid marinade, by weight; and said liquid marinade is composed of about 95 percent by weight water and about 5 percent by weight of a marinade concentrate composed of:

| Constituent | Weight Percent Range |
| --- | --- |
| sodium phosphate | 50–60 |
| autolyzed yeast | 10–20 |
| maltodextrin | 10–20 |
| sodium chloride | 10–20 |

-continued

| Constituent | Weight Percent Range |
| --- | --- |
| calcium silicate | 0–2 |
| beef extract | 0–2 |
| natural smoke flavor | 0–1. |

18. The process of claim 17, further including:

allowing some of said seasoning coating to drain from said seasoning-coated marinated chicken quarters, then placing said seasoning-coated, marinated chicken quarters on trays onto which said seasoning coating drains so as to become located underneath said seasoning-coated marinated chicken quarters, and conducting step (c) while said seasoning-coated marinated chicken quarters are supported on said trays.

19. The process of claim 18, wherein:

said aqueous suspension is prepared by mixing water and said dry seasoning mixture together in the approximate proportion of two quarts of water to four pounds of dry seasoning mixture, and said dry seasoning mixture is composed of:

| Constituent | Weight Percent Range |
| --- | --- |
| sodium chloride | 30–60 |
| maltrin | 25–35 |
| chili powder | 5–10 |
| dextrose | 0–10 |
| black pepper | 2–6 |
| cornstarch | 1–5 |
| onion | 1–5 |
| garlic | 1–5 |
| white pepper | 1–3 |
| celery | 0–1 |
| spices | 0–1. |

20. The process of claim 17, wherein:

said coating of moisture loss-reducing edible glaze is composed of:

| Constituent | Weight Percent Range |
| --- | --- |
| soybean oil | 40–60 |
| high fructose corn syrup | 20–60 |
| brown sugar | 0–20 |
| soy lecithin | 0–8 |
| honey | 0–4 |
| citric acid | 0–0.4. |

21. The process of claim 5, wherein:

steps (c) and (e) are conducted for a total of 50 to 75 minutes.

22. The process of claim 5, wherein:

as a result of conducting step (c) the surface-dried, seasoning-coated, marinated chicken quarters have internal temperatures in the range of 100° F. to 120° F.

23. The process of claim 5, wherein:

step (d) is conducted by brush-painting said coating of glaze onto the surface-dried, seasoning-coated, marinated chicken quarters.

24. The process of claim 5, wherein:

said coating of moisture loss-reducing edible glaze is composed of:

| Constituent | Weight Percent Range |
| --- | --- |
| soybean oil | 40–60 |
| high fructose corn syrup | 20–60 |
| brown sugar | 0–20 |
| soy lecithin | 0–8 |
| honey | 0–4 |
| citric acid | 0–0.4. |

* * * * *